Sept. 4, 1951  J. H. PALMER  2,566,905
AUTOMATIC ELECTRIC TOASTER
Filed Aug. 31, 1949
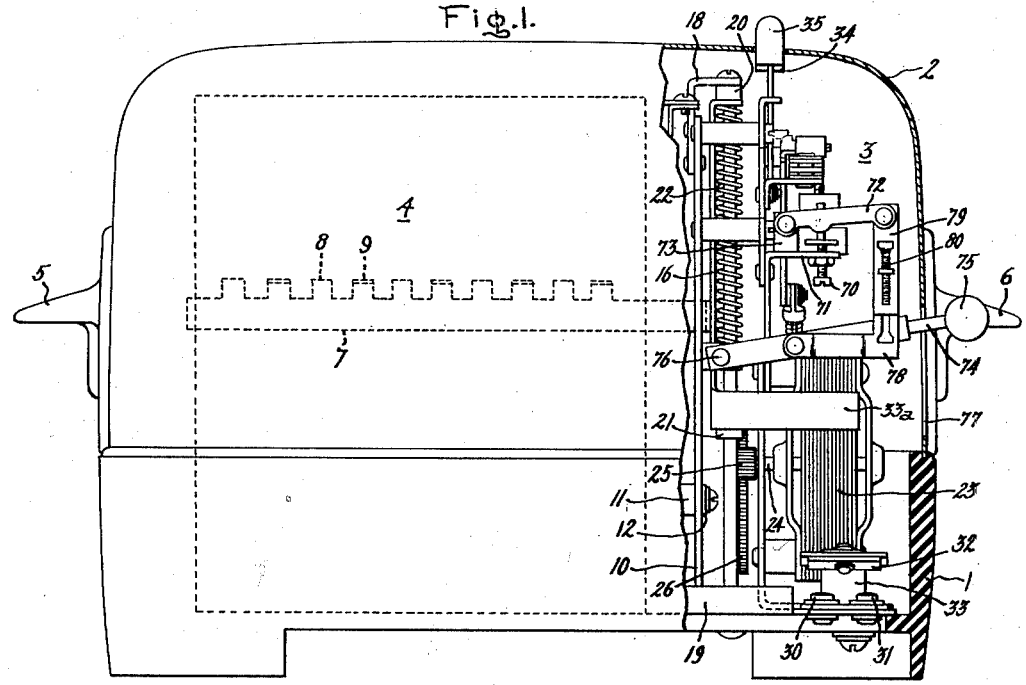
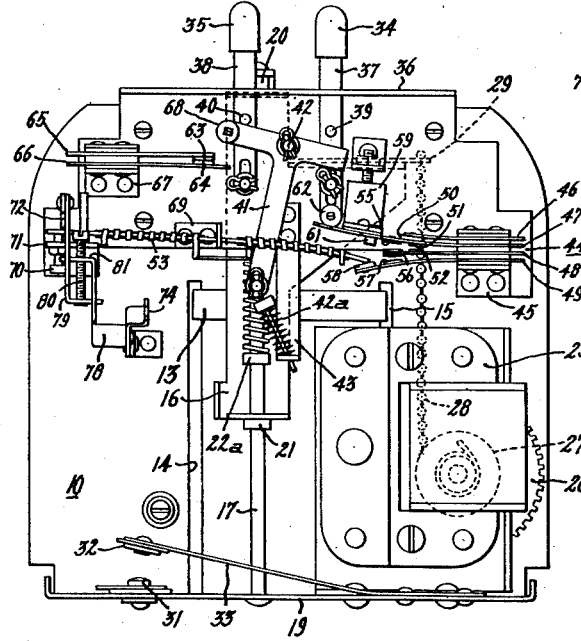
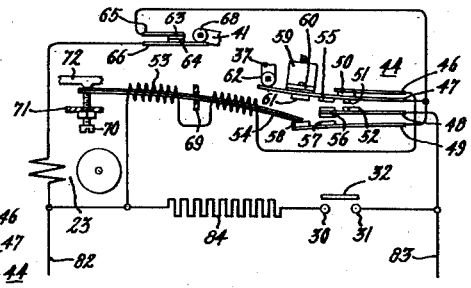
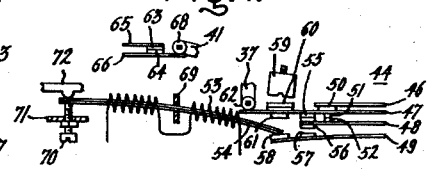
Inventor:
John H. Palmer,
by *Sheridan Neiby's*
His Attorney.

Patented Sept. 4, 1951

2,566,905

UNITED STATES PATENT OFFICE 2,566,905

AUTOMATIC ELECTRIC TOASTER

John H. Palmer, Milford, Conn., assignor to General Electric Company, a corporation of New York Application August 31, 1949, Serial No. 113,307

5 Claims. (Cl. 99—329)

This invention relates to electric cooking devices, and more particularly to a device for automatically making toast.

An object of my invention is to provide an apparatus into which food to be toasted may be placed and thereafter the entire toasting operation is performed automatically including lowering of the food into a toasting chamber, applying heat during a timed period, and raising the completed toast to an exposed position for ready removal.

A further object of my invention is to provide an improved control system for an automatic toaster which serves to place the mechanism in operation and time the heating period.

Still another object of my invention is to construct an automatic electric toaster at a reduced cost by simplification of the component parts.

In accomplishment of the foregoing objectives, a feature of my invention consists in a control system for a torque motor which lowers a toast carriage to toasting position, resulting in closure of the contacts of the toaster heating element. The torque motor remains in a stalled position until completion of the toasting operation, whereupon a spring return raises the toast as the torque motor is de-energized. The control system includes a contact bank having switches for energization of the torque motor and a switch controlling the application of power to a heating element thermally associated with a bimetallic strip to provide a heat-up, cool-down timing cycle. Initial closure of a pair of motor contacts simultaneously closes the contacts to the bimetal heating element. As the bimetallic strip changes shape, a second set of motor contacts close and the first set of motor contacts with the bimetal heating element contacts open in sequence, whereupon the bimetal cools and again changes shape opening the second set of motor contacts, thus discontinuing the toasting operation.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevation, partially in section, of my improved toaster; Fig. 2 is an end elevation of the toaster operating mechanism; Fig. 3 is a schematic wiring diagram with components positioned for the starting of a toasting cycle; and Fig. 4 is a schematic diagram of an operative position during a toasting cycle.

In the illustrated embodiment, I have shown in Fig. 1 an electric toaster having a plastic base 1 and an outer cover or hood 2 for enclosing a mechanism compartment 3 and a toasting compartment 4. Handles 5 and 6 may be attached to hood 2 on its end for convenience. Hood 2 is arranged to define the usual toast receiving slots at the top of the toaster to permit insertion of slices of bread or the like into toasting compartment 4. Disposed within the toasting compartment for each of the toast receiving slots is a rack 7 for supporting slices of foodstuff to be toasted. Each rack, fabricated from a flat strip of sheet metal, includes a plurality of alternate oppositely-directed and laterally-extending ears 8 and 9, as shown in Fig. 1.

The toasting compartment preferably is totally enclosed except for the toast receiving slots. In addition, a heat barrier plate 10 is employed to thermally isolate the mechanism compartment from the toasting compartment. To avoid thermal conduction of heat, this heat barrier plate may be supported by suitable fastening devices with an insulating bushing 11 and insulating washers 12 associated with each such fastening device.

The toast racks 7 are arranged within the toasting compartment for movement between a non-toasting position as shown in Fig. 1 and a lower toasting position (not shown). While a toaster in accordance with this invention may include a single toast rack 7 or a plurality of such toast racks, in the present embodiment the invention is illustrated for a toaster including two toast-receiving racks. An end of each toast-receiving rack extends outwardly through heat barrier plate 10 into the mechanism compartment and the racks are connected together by a cross piece 13, as shown by Fig. 2. To permit the vertical reciprocating movement of the racks, the heat barrier plate is slotted at 14 and 15. Cross piece 13 is secured to a vertically disposed supporting plate 16 which in turn is slidably mounted on a guide post 17. As shown in Fig. 1, this guide post is secured to a bracket 18 on the toaster frame at its upper end, and to a base plate 19 at its lower end, as shown in Fig. 2. The upper and lower ends of supporting plate 16 include laterally extending ears with bushings 20 and 21 respectively attached to these ears for sliding engagement on guide post 17. With this construction both of the toast carrying racks are mounted for reciprocating movement on guide post 17. Encircling the guide post is a compression spring 22 adapted to be compressed between the upper laterally extending ear on the rack supporting plate and a collar 22a secured to guide post 17. Therefore, a downward movement of the rack, cross piece 13, and supporting plate 16, compresses spring 22. The assembly of the racks, the cross piece, and the supporting plate will be hereinafter referred to as the toast carriage.

In accordance with my invention, the toast carriage is driven to its lower or toasting position by a power drive. This drive is powered by an electric motor 23, such as a two-pole induction motor, designed as a torque motor such that its rotor rotates to lower the carriage to its fully lowered position and then remains energized in a stalled position during the remainder of the toast heating cycle. As shown in Fig. 1, the shaft 24 of this motor rotates a drive pinion 25 for meshing engagement with a drive gear 26. Drive gear 26 carries a winding drum 27 adapted to wind a chain 28 around its outer surface. The upper end of chain 28 is affixed to a laterally extending arm 29 on carriage supporting plate 16. Therefore, when the motor is energized the chain 28 is wound onto drum 27 lowering the carriage to its toasting position and compressing spring 22.

The downward motion of the carriage serves to close the electrical circuit to the main heating element within the toasting compartment. Referring to Fig. 1, the contacts of the main heating element circuit are shown at 30 and 31, insulatingly supported on base plate 19. Adapted to close the circuit through contacts 30 and 31 is a bridging contact 32 secured to but insulated from a resilient arm 33 which is riveted to base plate 19. The resilient arm normally retains the bridging contact member displaced from contacts 30 and 31. However, on downward movement of the carriage, an outwardly-extending arm 33a, best shown in Fig. 1, engages spring arm 33 to force the bridging contact into engagement with the fixed contacts, thus closing the heating element circuit. With this construction, whenever the toast carriage is in its lower or toasting position, the heating element for the toasting compartment is energized.

With the toaster arrangement as described above, it is seen that the automatic operation is entirely dependent upon the supply or interruption of electric power to motor 23. Energization of the motor serves to draw the toast carriage downward into toasting position and to close the contacts to the main toaster heating element. At such time as the circuit to motor 23 is interrupted, carriage spring 22 raises the completed toast to an exposed position where it may be readily withdrawn. In accordance with my invention, operation of the toaster is completely controlled by a pair of push buttons 34 and 35. Depression of button 34 places the toaster in operation for a complete toasting cycle, during which the heating period is automatically timed for the desired degree of toasting. Push button 35 permits manual interruption of a toasting operation at any time.

Referring to Fig. 2, the motor control assembly is mounted on a switch plate 36. Push button 34 is attached to the upper end of a switch operating rod 37 slidably supported by the switch plate. Likewise, operating button 35 is attached to an operating rod 38 which is slidably supported by the switch plate. A toggle mechanism is provided for cooperation with switch rods 37 and 38, so that whenever one of the buttons is depressed, the other operating rod is placed in an inoperative position. As shown in Fig. 2, operating rod 37 has an outwardly projecting pin 39, and rod 38 has a similar pin 40. These pins are adapted to engage the laterally-extending arms on the head of a T-shaped rocker 41, which is pivotally supported on the switch plate by a pin 42. Secured at the lower end of the T-shaped rocker 41 in any suitable manner is a compression toggle spring 42a, which is held in compression between the lower end of member 41 and a fixed bracket member 43. Hence this T-shaped rocker member, under the influence of its compression spring 42a, always assumes one of its extreme positions.

For the automatic starting and stopping of electric motor 23, a contact stack assembly, indicated generally at 44, is provided. This contact stack is secured to the switch plate on an angle bracket 45, as shown by Fig. 2. The contact stack assembly includes four spring contact arms 46, 47, 48 and 49 secured in spaced relation with respect to each other and to the supporting bracket by insulating blocks. Contact arm 46, at its outer or movable end, is spaced from contact arm 47 by an insulating block 50. A contact point 51, secured to contact arm 46, is adapted to cooperate with a contact point 52 on contact arm 48 and when these two contacts are closed power is supplied to a heating element 53 surrounding a bimetallic strip 54. Contact arm 47 carries on its outer end a contact point 55 adapted to complete a circuit, by closing with contact point 56 on contact arm 48, to motor 23 at the start of a toasting cycle. Contact arm 49 carries adjacent its outer end a contact point 57, also adapted to complete a circuit through contact 56 to motor 23. Contact arm 47 is fabricated so that its resiliency normally tends to force contact points 55 and 56 together.

With contacts 55 and 56 closed, the spacer 50 between contact arms 46 and 47 permits the contact arm 46 to force contact point 51 into circuit-making engagement with contact point 52. Also, the inherent resiliency in contact arm 49 tends to force contact 57 into engagement with contact 56. However, contact arm 49 has an insulating button 58 on its outer end in operative relation with the free end of bimetallic element 54. When the bimetallic element is cool, as shown in Fig. 2, it serves to retain contact points 56 and 57 separated from one another. Contact points 55 and 56, along with contact points 51 and 52, are retained in open position by a magnet 59 attracting an armature 60 on the outer end of contact arm 47. Movement of the free end of the bimetallic element is adapted to contact either the insulating button 58, corresponding to the cool position, or an insulating button 61 carried on the opposite side of contact arm 47 from the magnetic armature 60. With this arrangement of the motor contacts, initiation of toaster operation results from a depression of button 34, resulting in a downward movement of rod 37 and a ceramic insulator 62 on its lower end, in order to force the contact arm 47 away from the attraction of magnet 59. Once the magnetic attraction between magnet 59 and armature 60 is broken, the inherent resiliency of contact arms 46 and 47 results in a closure of the contact points 55, 56 and 51, 52, thus starting motor 23 and supplying power to the thermostat heater 53, respectively.

To interrupt motor operation at any time during the toasting cycle, normally closed contact points 63 and 64 carried by resilient arms 65 and 66 are provided. These contact arms are supported on the switch plate on an angle bracket 67, with the contact arms spaced from each other and from bracket 67 by insulating blocks as shown in Fig. 2. The lower contact arm 66 has an outwardly extending portion adapted to be engaged by an insulating bushing 68 carried on the left-hand end of the head of the T-rocker shown by Fig. 2. With this arrangement, a downward movement of push button 35 moves the operating rod downwardly so that the pin 40 carried by this rod forces bushing 68 downward to move contact arm 66 downwardly, thus opening contacts 63 and 64 to interrupt supply of power to motor 23.

The timing of the toasting cycle in accordance with this invention is performed by a heat-up, cool-down thermostat. The bimetallic element making up thermostat 54 is supported approximately intermediate its end on a bracket 69 secured to the switch plate. The left-hand end of the bimetallic element is adjustably supported as is described at a later point. The right-hand end of the bimetallic element is free to move between the insulating buttons 58 and 61 carried on contact arms 49 and 47, respectively. The thermostat position shown in Fig. 2 represents its position when cool. When the thermostat is heated under the action of the encircling heater 53, the right-hand end of the thermostat moves upwardly to contact insulating button 61.

The left-hand end of the thermostat is supported for limited movement between adjustable stops. As described above, as the thermostat cools its free end moves downwardly into contact with insulating button 58, resulting in an upwardly directed force on the right-hand end of the thermostat strip. Due to the pivotal mounting of the thermostat intermediate its ends, this upwardly directed force on the right-hand end causes a downwardly directed force on the left-hand end, resulting in contact of the left end of the thermostat with a cool-down adjusting screw 70 shown in Fig. 1. Cool-down adjustment screw 70 is carried on a bracket 71 connected to the switch plate. The heat-up adjustment comprises a pivotally mounted stop arm 72, as shown in Fig. 1, pivotally mounted at its left-hand end on an upwardly extending ear 73 on bracket 71. As the bimetal element heats up, its free end moves upwardly into contact with insulating button 61, resulting in a downward force on the right-hand end of the thermostat as shown in Fig. 2. This downward force on the right-hand end results in an upward force on the left-hand end of the bi-metallic element so that the left-hand end comes into engagement with stop lever 72.

Positioning of stop lever 72 is performed by a color control lever 74 having on its outer end a knob 75 for convenient movement by the toaster operator. Color control lever 74 is pivotally mounted on heat barrier 10 at 76, so that it may be moved upwardly or downwardly in a slot 77 in the toaster outer hood 2. Pivotally connected to color control lever 74 is an angle lever 78, which in turn is adjustably connected through a link 79 to stop lever 72. Thus, any downward movement of the color control lever 74 results in a corresponding downward movement of angle lever 78, to transmit through the connecting link 79 a similar downward movement to stop lever 72. The color control lever, therefore, is capable of adjusting the period of time elapsing from the start of the heat-up cycle of the thermostat until contact points 55 and 56 are opened. To provide for initial factory adjustment, the color control lever is adjustably connected to stop lever 72. This adjustment, shown most clearly in Fig. 2, includes a threaded member 80 engaging a laterally extending flange 81 on angle lever 78. The end of screw 80 is rotatably secured to the connecting link 79, so that rotation of the screw results in relative movement between angle lever 78 and connecting link 79 to initially adjust the proper position of the pivotally mounted stop lever 72.

The operation of this toaster may be more clearly understood by a reference to the schematic diagrams of Figs. 3 and 4. The position of the various parts prior to initiation of the toasting operation are shown in Fig. 3, and it may be noted that all of the contact points are open with the exception of contact points 63 and 64. A downward movement of bushing 62 on the operating rod 37 in response to operation of push button 34, moves the end of contact arm 47 downwardly, breaking the engagement of magnet 59 for armature 60. The inherent resiliency of contact arms 46 and 47 thereafter closes contact points 55 and 56 and contact points 51 and 52. Closure of contact points 55 and 56 completes the circuit from the incoming electrical supply lines 82 and 83 through motor 23 and contacts 63 and 64. Operation of the motor drives the toast carriage down, forcing bridging contact 32 into circuit-making position with the contacts 30 and 31 for the main toaster heating element 84. The simultaneous closure of contacts 51 and 52 supplies power from the power supply lines to the heating element 53 encircling the bimetallic strip 54. This position of the contacts is shown by Fig. 4, indicating the beginning of the thermostat heat-up cycle. As the thermostat becomes heated, its free end moves upwardly out of contact with the insulating button 58, permitting contacts 56 and 57 to close.

As is evident from Fig. 3, contacts 56 and 57 are in parallel with contacts 55 and 56 so that the motor circuit may be completed through either sets of contacts. A further heat-responsive movement of the bimetallic element results in its free end coming into contact with insulating button 61, and thereafter the contact arm 47 is raised until magnet 59 attracts armature 60 to separate contacts 55 and 56 along with contacts 50 and 51. At this point in the operation, power is still supplied to the electric motor through contact points 56 and 57. However, the thermostat heater 53 is disconnected from its power supply permitting the bimetallic element to cool. As the bimetallic element cools, its free end moves downwardly until it contacts insulating button 58, eventually separating contacts 56 and 57 to interrupt the supply of power to motor 23. When the motor circuit is thus opened, the carriage spring 22 returns the toasting carriage to its upper position and opens the circuit to the main toaster heating element 84. The mechanism is then again in the position shown by Fig. 3, and readied for another cycle of operation. The length of time for the toasting cycle may be readily controlled by the operator by adjustment of color control lever 74. This control, plus the threaded member 70 to control the cool-off portion of the cycle, changes the relative position of the left-hand end of the bimetallic element and hence changes the relative position of the right-hand or free end of the bimetallic element with respect to contact arms 47 and 49. At any time during the toasting cycle, operation may be interrupted merely by depressing button 35, which forces the insulating bushing 68 carried on the head of the T-shaped rocker to open contact points 63 and 64.

Numerous modifications may be made in the above control mechanism without departing from this invention. For example, in lieu of employing the T-shaped rocker 41 and its accompanying overcenter spring 42a, suitable magnetic means could be employed for retaining contacts 63 and 64 in an open position after depression of stop button 35. Another obvious modification would be to locate the magnetic core for motor 23 in an appropriate position so that its magnetic attraction could be used in place of the permanent magnet 59.

From the foregoing, it is seen that an automatic toaster is provided for performing a complete toasting operation in response to the depression of a single start button or slight downward movement of the toast carriage. Thereafter, the complete toasting cycle, including timing of the toasting operation, is performed automatically. However, manual means are provided for convenient interruption of the toasting operation at any point during the cycle. Furthermore, this construction lends itself to mass production methods, since no close tolerances in the component parts are required and no highly polished and accurately ground latching members or similar devices are necessary. This permits production of a fully automatic toaster at a reduced cost.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an automatic electric toaster, a toast carriage movable between toasting and non-toasting positions, resilient means for biasing said carriage to non-toasting position, an electromagnetic means for moving said carriage to and retaining it in toasting position, a control system for supplying power to said electromagnet means, said system comprising first and second switching devices electrically connected together in parallel and in series circuit relation with said electromagnetic means across a power supply source, manual means for closing the first of said switching devices to apply power to said electromagnetic means to commence toaster operation, a bimetallic element operatively associated with said switching devices and having a cool position retaining the second of said switching devices in its open position and a heat-responsive motion closing the second of said switching devices and opening the first of said switching devices in sequence, a heater thermally associated with said bimetallic element, and contacts controlling the supply of electrical power to said heater, said contacts opening and closing upon corresponding motion of the first of said switching devices.

2. A control system for an automatic electric toaster of the type having a toast carriage resiliently biased to non-toasting position comprising a torque motor for driving said carriage to toasting position and retaining it in such position during toaster operation, a bimetallic element, a heater thermally associated with said bimetallic element, a pair of motor switches electrically connected in parallel and in series circuit relation with said motor across a power source, means biasing said motor switches to closed position, a heater switch for controlling supply of electrical power from the power source to said heater, said heater switch being operable between open and closed positions in correspondence with opening and closing of the first of said motor switches, said bimetallic elements being operatively associated with said motor switches and having a cool position adapted to open the second of said motor switches and a heat responsive motion adapted to close the second of said motor switches and open the first of said motor switches in sequence, magnetic means retaining said first motor switch and said heater switch in open position, and means operable to overcome said magnetic means for commencing a toasting operation by closure of said first motor switch and said heater switch.

3. In an electric toaster having a toast carriage resiliently biased to non-toasting position, a motor for driving the carriage against the resilient biasing force and retaining the carriage in toasting position while remaining in an energized stalled position, means energizing the toaster heating element when the carriage is in its toasting position, a control for timing the toasting operation comprising a bimetallic element including a heater thermally associated therewith, a first set of motor contacts biased to closed position and in series circuit relation with the motor across a power source, a set of heater contacts biased to closed position for connecting said heater to the power source when closed, magnetic means for retaining said first motor contacts and said heater contacts open, a second set of motor contacts biased to closed position and electrically connected in parallel with said first motor contacts, said bimetallic element having a movable portion thereof operably positioned with respect to said sets of motor contacts for retaining said second set of motor contacts open when cool and for opening said first set of motor contacts along with said heater contacts when heated, and a manually operable member to initially close said first set of motor contacts and said heater contacts.

4. An electric toaster comprising a frame enclosing a toasting compartment and a mechanism compartment, a toast carriage mounted on said frame for movement between toasting and non-toasting positions, resilient means biasing said carriage to its non-toasting position, an electric motor for driving said carriage to its toasting position against the action of said resilient means, said motor remaining in an energized stalled position during the toasting operation, and means controlling the supply of electrical power to said motor, said means comprising first and second motor switches electrically connected in parallel in the motor circuit, said first and second motor switches being normally biased to closed positions, magnetic means for retaining said first motor switch in its open position, a member operable external of said toaster to initially close said first motor switch, a bimetallic element having a heater thermally associated therewith, the cool position of said bimetallic element retaining said second motor switch in open position, heat responsive motion of said bimetallic element closing said second motor switch and opening said first motor switch in sequence, heater contacts adapted to supply power to said heater when closed and operable between opened and closed position upon corresponding movement of said first motor switch, and a third motor switch in series circuit relation with said motor manually operable at any time for terminating toaster operation.

5. An automatic electric toaster comprising a toast carriage movable between non-toasting and toasting positions, means biasing said carriage to its non-toasting position, a torque motor for driving said carriage to and for retaining it in toasting position, said motor remaining in an energized stalled postion when said carriage is in toasting position, a first set of motor contacts resiliently biased to closed position, magnetic means retaining said contacts in open position, a second set of motor contacts adjacent said first set and electrically connected in parallel, said motor being connected across a power source in series with said contacts, a bimetallic element having a movable portion positioned intermediately said first and second sets of contacts, an electric heater for said bimetallic element connected across said power source, a switch for said heater operating from closed to open position in synchronism with said first set of motor contacts, a starting member manually movable for effecting closure of said first set of contacts by overcoming said magnetic means, said bimetallic element having a cool position retaining said second set of contacts open and a heat responsive motion closing said second set and opening said first set of contacts in sequence, whereby said magnetic means maintains said first set of contacts in open position and subsequent cooling of said bimetallic element opens said second set of contacts to terminate toaster operation.

JOHN H. PALMER.

REFERENCES CITED

The following references are of record in the file of this patent:

UNITED STATES PATENTS

| Number | Name | Date |
|---|---|---|
| 2,266,301 | Biebel | Dec. 16, 1941 |
| 2,288,713 | Ireland | July 7, 1942 |
| 2,325,551 | Scharf | July 27, 1943 |
| 2,363,169 | Fischer | Nov. 21, 1944 |